United States Patent [19]

Sanderford et al.

[11] Patent Number: 5,652,592
[45] Date of Patent: Jul. 29, 1997

[54] RADIO LOCATION WITH ENHANCED Z-AXIS DETERMINATION

[75] Inventors: H. Britton Sanderford, New Olreans; Robert E. Rouquette, Kenner, both of La.

[73] Assignee: Sanconix, Inc, New Orleans, La.

[21] Appl. No.: 470,739

[22] Filed: Jun. 6, 1995

[51] Int. Cl.$^6$ ........................................................ G01S 1/00
[52] U.S. Cl. ........................ 342/385; 342/120; 342/123; 342/462
[58] Field of Search ........................... 342/462, 120, 342/123, 385

[56] References Cited

U.S. PATENT DOCUMENTS

| | | | |
|---|---|---|---|
| 3,082,324 | 3/1963 | Schuck | 342/123 |
| 4,163,216 | 7/1979 | Arpino | 340/152 R |
| 5,117,359 | 5/1992 | Eccles | 364/420 |
| 5,160,933 | 11/1992 | Hager | 342/174 |
| 5,202,684 | 4/1993 | Funatsu | 340/961 |

*Primary Examiner*—Thomas H. Tarcza
*Assistant Examiner*—Dao L. Pham

[57] ABSTRACT

An enhanced system for calculating the Z-Axis, or relative height or altitude, of a radio beacon. The present invention uses a barometric pressure sensing device co-located with the radio emitter to transmit data representing relative altitude. To further enhance the Z-Axis determination, one or several barometric sensors, located at known heights, are positioned around the city to provide real time barometric data. This real time data is used to form a differential correction factor which is compared to the to the time varying barometric sensor co-located with the radio emitter, thereby yielding Z-Axis accuracies of up to one (1) foot. Since the altitude essentially becomes a "known", this information can also be used in the least squares fit algorithm to enhance the X and Y determination as well. As an alternative to differential readings from "known" altitude barometric sensors, the X,Y position of the radio emitter itself, or a check-in by a user, can be used to determine times when the radio emitter is at a known altitude thus providing occasional positions for "self" correction. Further, a mobile barometric reference, with a known Z-axis, can be purposely brought in proximity of the unknown altitude transmitter by, for example, a search team to provide differential information. Lastly, additional radio techniques are taught to assist a mobile search team.

44 Claims, 2 Drawing Sheets

Block Diagram of:

Unknown Position Xmitter, UPX
Mobil Reference Xmitter, MRX
Fixed Reference Xmitter, FRX

RADIO LOCATION WITH ENHANCED Z-AXIS DETERMINATION

FIELD OF THE INVENTION

The present invention relates to time-of-flight radio location determining systems, and in particular to an enhanced system for calculating the Z-Axis, or relative height or altitude, of a radio beacon, which may be fixed or mobile.

In time-of-flight radio location systems, hyperbolic or spherical lines of position must intersect to determine the point of origin of a radio beacon which is being tracked. Such intersections can be calculated by least square fit algorithms. Because the remote receiving antennas are generally in the same approximate plane as the radio emitter, very poor Z-Axis, or height, calculations result. This makes radio location within a tall building difficult, time consuming or impractical.

The present invention uses a barometric pressure sensing device co-located with the radio emitter to transmit data representing relative altitude. To further enhance the Z-Axis determination, one or several barometric sensors, located at known heights, are positioned around the city to provide real time barometric data.

This real time data is used to form a differential correction factor which is compared to the to the time varying barometric sensor co-located with the radio emitter, thereby yielding Z-Axis accuracies of up to one (1) foot. Since the altitude essentially becomes a "known", this information can also be used in the least squares fit algorithm to enhance the X and Y determination as well.

As an alternative to differential readings from "known" altitude barometric sensors, the X,Y position of the radio emitter itself, or a check-in by a user, can be used to determine times when the radio emitter is at a known altitude thus providing occasional positions for "self" correction. Further, a mobile barometric reference, with a known Z-axis, can be purposely brought in proximity of the unknown altitude transmitter, for example, by a search team, to provide differential information. Lastly, additional radio techniques are also taught to assist, for example, a search team.

BACKGROUND OF THE INVENTION

While the prior art has contemplated various and diverse time-of-flight systems for discerning the location of a radio transmission source, basic systems have tended to provide somewhat limited, two dimensional location data, neglecting the Z-Axis, which corresponds to height, or the third dimensional location of the transmitter. Such prior art systems have been adequate where location of the transmitter was fixed in a relatively flat, planar location field, but would be inadequate for utilization where precise, three dimensional location was a necessity.

A prior listing of patents believed to have at least some cursory pertinence to the present invention is provided below:

| Patent Number | Inventor(s) | Date of Issue |
|---|---|---|
| 5,225,842 | Sturza et al | 07/06/1993 |
| 5,210,540 | Masumoto | 05/11/1993 |
| 4,731,613 | Motoki et al | 03/15/1988 |

Typically in a radio location system, receiving towers are placed at distant locations. Due to the economics and cost of each receiver station, it is desirable to locate these receivers as widely separated as possible. This has the effect of placing the receivers in approximately the same plane of operation of one another.

GPS systems, utilizing multiple satellites to fix location, have the advantage of considerably increased altitude, which improves the intersection geometry of the lines of position. GPS systems, however, have difficulties at fixing positions at very great travel distances. These distances increase the overall path loss and require reasonably good antenna view and antenna gain. In a system intended to operate from within a multi-story building, the signal attenuation of a GPS system would tend be too great to provide an adequate signal margin to compute a position fix.

In ground based receiving systems, the solution is to place additional receivers at increased heights, in order to improve geometries of intersection, for a three dimensional fix. This has the disadvantage of additional cost. This has the further disadvantage of propagation path constraints forced by the building's construction.

Altitude sensors have been used in combination with GPS receivers in order to reduce the number of receivers which must be in view in order to provide a three dimensional position fix, or even a two dimensional position fix; see, for example, U.S. Pat. No. 5,210,540. See also U.S. Pat. Nos. 5,225,842, 5,265,025 or 4,731,613. The disclosures in the prior art teach techniques whereby a receiver may better estimate its own position, so long as that position is in reasonably clear view of one or more GPS satellite transmitters.

In summary, the known prior art does not disclose techniques which would locate an unknown positioned transmitter emitting a signal greatly attenuated because it is located deep within a multi-story building. Further, the prior art references do not use transmit only techniques which allow for the increased battery life and small size required to make this application practical.

Lastly, the above references do not teach utilizing a mobile reference unit to increase the accuracy and enhance the ability to find an unknown positioned transmitter within a building.

GENERAL SUMMARY DISCUSSION OF THE INVENTION

Unlike the prior art above, the present invention provides an effective, easily implemented, and consistently accurate system for discerning the three dimensional location of a fixed or mobile radio beacon of unknown position, utilizing time-of-flight location determining methods.

In time-of-flight radio location systems, hyperbolic or spherical lines of position must intersect to determine the point of origin of a radio beacon or transponder which is being tracked. Such intersections can be calculated by least square fit algorithms.

Because the remote receiving antennas are generally in the same approximate plane as the radio emitter, however, very poor Z-Axis, or height, calculations result. This makes radio location within a tall building difficult, time consuming or impractical. The present invention uses a barometric pressure sensing device co-located with the radio emitter to transmit data representing relative altitude.

To further enhance the Z-Axis determination, one or several barometric sensors, located at known heights, are positioned around the city to provide real time barometric data. This real time data is used to form a differential correction factor which is compared to the to the time varying barometric sensor co-located with the radio emitter, thereby yielding Z-Axis accuracies of up to one (1) foot.

Since the relative altitude essentially becomes a "known", this information can also be used in the least squares fit algorithm to enhance the X and Y determination as well. As an alternative to differential readings from "known" altitude barometric sensors, the X,Y position of the radio emitter itself, or a check-in by a user, can be used to determine times when the radio emitter is at a known altitude thus providing occasional positions for "self" correction.

The present invention uses both conventional time-of-arrival or other radio location means, as is known in the art, combined with barometric pressure information measured in co-location with the unknown position transmitter. One-way transmission systems yield hyperbolic lines of positions, whereas two-way communication systems can yield spherical lines of positions. Since the receiving elements are located at a great distance from the unknown position transmitter, the lines of positions which result are nearly parallel to the Z-axis. This is a result of all of the receiving elements being in the same approximate plane as the unknown position transmitter.

It is, therefore, very difficult for the central processing unit to establish a clear intersection of the lines of position in the Z-axis. The present invention uses barometric pressure to derive altitude information to resolve the Z-axis with greater accuracy.

Each unknown position transmitter is equipped with a barometric pressure sensing device which in turn sends that data to a remote receiving device via the unknown position transmitter. Barometric readings are essentially relative in nature and must be compensated by way of various means. One of the means is temperature compensation. The unknown position transmitter, optionally, may be equipped with a temperature sensing element. That sensing element is in turn connected to the unknown position transmitter's output. Temperature compensation may be accomplished at the unknown position transmitter or temperature information itself may be transmitted by the unknown position transmitter.

In addition, there are certain daily and seasonal cycles which can be anticipated by the central processing unit. Historic information relating to barometric readings zoned across the citywide installation can be stored in a local data base. This historic trend information can then be used to estimate errors based on time of day or time of season. This information can be used to reduce the error component in a barometric reading to yield a more accurate altitude estimation.

Further, compensation may be accomplished by placing reference transmitters similarly equipped with barometric sensing elements at known locations and installations. Desirable locations would include those at ground level, as well as those at various elevations around an installation or a city. These references can then be used to track daily variations in barometric pressure as well as linearization improvements.

Most multi-story buildings have an artificial difference in atmospheric pressure from indoors to outdoors. This is caused by the construction of the building itself, wind convection currents around the building, and HVAC systems employed to control the building's temperature and environment. Because of this, it may be desirable to place a fixed reference within the building itself.

It is envisioned that the unknown position transmitter will send a regularly spaced supervisory transmission to indicate the health of the transmitter electronics. Since most applications will have a transmitter worn by an individual, that individual will move the transmitter over a variety of locations in a typical day.

These include at home, driving to work, in the office, etc. A central monitoring processor can use the information derived from radio location position fixes to establish a high probability that an unknown position transmitter is in a certain X,Y location. That same X,Y location is known to have only one possible altitude, such as on an interstate, a grocery store, etc., then this information can be used to provide a further reference. When the central processor can determine that the X,Y position forces a known altitude, this altitude reading can be used as a reference to calibrate the unknown position transmitter's barometric sensor with its own self.

As a further error-compensating technique, a search team with a mobile reference unit can be guided towards the unknown position transmitter. As it gets closer to the unknown position transmitter, a differential pressure reading can be taken to help determine the difference in Z-axis position of the mobile team versus the unknown position transmitter. Further, once the team enters a multi-story building, they are at a known altitude, and the central processing unit may use this "first floor/known floor" information to establish an altitude reference.

Further, once the team travels up a stairwell or an elevator, the sign of the differential pressure information can be used to indicate when the team has passed the floor where the unknown position transmitter is likely to be located (or the central processor unit can look for when the barometric pressure information is equal indicating that the search team is now on the same floor as the unknown position transmitter.

In addition to these other calibration techniques, the central processing unit can keep a historic data base of altitude profile information from the last M transmissions of the unknown position transmitter. This information may be used as a clue to help determine the actual position of the unknown position transmitter.

Since the Z-axis position will be more accurately produced from altitude information than from lines of position, the Z-axis information from the altitude prediction can be used to enhance the X,Y position calculation. The altitude information can be fed directly into a least squares fit algorithm or the like, thereby reducing the unknown in Z-axis location. Since the Z-axis becomes known, the least squares fit algorithm may more accurately produce results relating to the X,Y location.

Lastly, the user may "check in" from time to time with the central processing unit to indicate relocation of the unknown position transmitter. The central processing unit can then associate the present altitude information with the location that it is currently in. This process can be done in places where the user frequents such as office or home or school, etc.

Future gravimetric sensors may become more sensitive and physically small. If so, the barometric device may be replaced or augmented by a gravimetric measuring device. The techniques noted herein would all be appropriate to the information provided by a gravimetric sensor.

Signal amplitude/SNR information can be used by the search team to determine which floor a UPX is located on. An MRX can directly measure signal amplitude received from a UPX and display that level. When the search team travels up a stairwell or up an elevator, the signal level will decrease once the floor the UPX is located on is passed. This will indicate the correct floor to the search team, or to the central processing station if that information is relayed to a remote receiver.

Lastly, a mobile barometric reference, with a known Z-axis, can be purposely brought in proximity of the unknown altitude transmitter to provide differential information.

It is therefore an object of the present invention to provide a system for providing three dimensional location information on a transmitter having an unknown position location, such as, within a building.

Further, it is an object of the present invention to provide three dimensional location information on a transmitter within a structure where radio signals are highly attenuated by the construction methods utilized, such as, for example, steel frame structures such as high rises or the like.

It is another object of the invention to provide a highly reliable position fix appropriate for life safety applications wherein, for example, a mobile search team could be led via other radio communications means, to the unknown position transmitter.

It is another object of the invention is to provide a position location system utilizing a radio beacon or transmitter operating only in a transmit mode, thereby providing decreased size and cost, and enhanced battery life. Transmit only systems may be configured to send out periodic transmissions which include barometric or gravimetric information.

Lastly, it is an object to provide a position location system utilizing a barometric information in a manner to increase the X,Y plane accuracy.

BRIEF DESCRIPTION OF DRAWINGS

For a further understanding of the system of the present invention, reference should be had to the following figures, which are more fully described in the specification infra.

DETAILED DISCUSSION OF THE INVENTION

The present invention teaches the utilization of a uniquely configured transmitter which is enhanced to allow for the calculation of estimated location of said transmitter in three dimensions.

Figure 1:
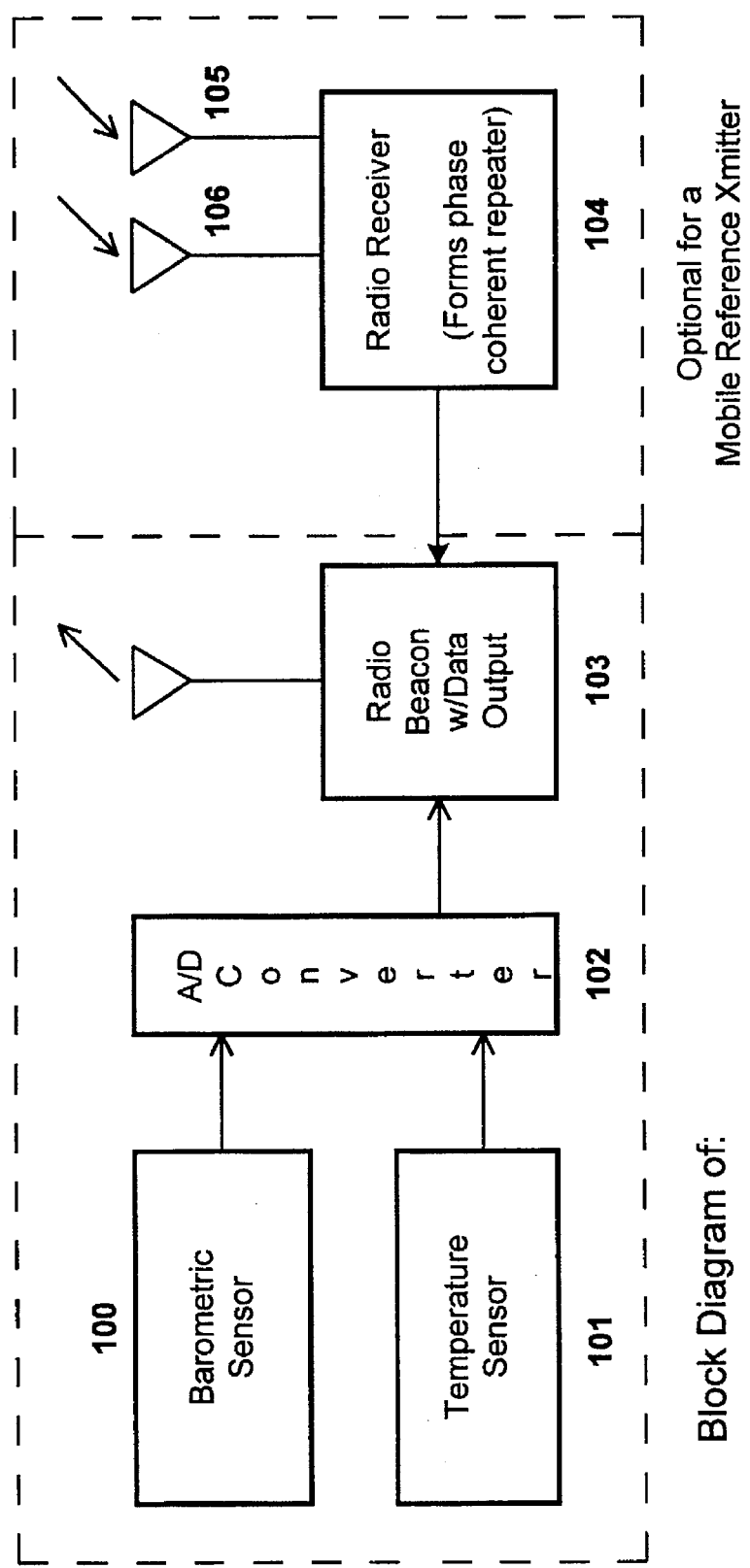
FIG. 1 is a block diagram of an exemplary embodiment of the Z-Axis determination system of the present invention, illustrating the operation of a position or reference transmitter.

FIG. 1 illustrates three, alternative transmitters, including a unknown position transmitter UPX, the mobile reference transmitter, MRX, and the field reference transmitter, FRX, as will be more fully explained, infra.

The preferred embodiment of the present invention is based upon a transmit only unknown position transmitter architecture. Two-way transmission will yield similar Z-axis accuracy results but at the penalty of additional size and cost in reduced battery life.

It is anticipated that this transmitter device would be miniaturized and worn on individuals to summon help in the case of an emergency. It is also possible that similar transmitting units be affixed to objects which may be stolen as to simplify recovery. It is also envisioned that a similar device may be worn by a parolee or early release/alternative incarceration participant. In this case the system would be used to accurately track the whereabouts of the wearer.

Continuing with FIG. 1 of the drawings, an exemplary position or reference transmitter as utilized with the present invention, barometric sensor means 100 is configured to output a voltage or a current to the analog to digital converter 102. In the alternative, pulse width information or other information representative of the barometric level may be generated. The barometric data is then communicated to the radio beacon transmitter 103.

The radio beacon transmitter is capable of being remotely located by two or more receiving devices. The preferred invention uses time-of-flight as a method to accomplish radio location, although other techniques which are known in the art may be used as well.

In addition to the time-of-flight signal transmitted by the radio beacon, the radio transmitter must be capable of outputting data representative of the barometric pressure level. Transmissions from the radio beacon may be initiated by, for example, a periodic timer or by a demand from the user.

Since most barometric sensing devices are temperature sensitive, a temperature sensing element may be optionally provided 101. This information is likewise passed to the analog to digital converter 102 and then to the radio beacon 103. Alternatively, the temperature compensation sensor 101 may directly compensate the barometric sensor 100; this may be performed by a processor located within the radio beacon transmitter. In still another alternative embodiment, temperature compensation can be remotely computed by a central processing device which is remotely located.

As an alternative or as an enhancement to the barometric altitude determination as noted herein, a radio receiver 104 may be added to a mobile reference transmitter. The radio receiver would be able to use amplitude and/or phase information to help determine the altitude of the UPX. For example, if the receiver 104 receives a signal from a UPX and then retransmits it via radio beacon 103 in a phase coherent form, then this repeated information may be used by central information processing device 209 to compute the time-of-arrival lag. The lag is the difference in the time-of-arrival and the MRX signal as compared to the repeated UPX signal. This lag is used to compute the sphere about the MRX. The highest altitude of the sphere is the maximum height of the UPX.

The amplitude of the UPX may also be tracked by radio receiver 104. This tracking is greatly enhanced by the use of diversity methods to reduce fades which would cause misleading readings. Antenna diversity 105 and 106 may be employed for this purpose. Antenna diversity may be in the form of circular polar or position, for example. Frequency diversity may also be used in order to reduce the fading effects which could lead to incorrect floor information. For example, the signal level will increase until the search team passes the correct floor, then it will decrease. The increases and decreases used to make correct floor decisions must be significant as compared to the signal fluctuations caused by radio fading.

Figure 2:
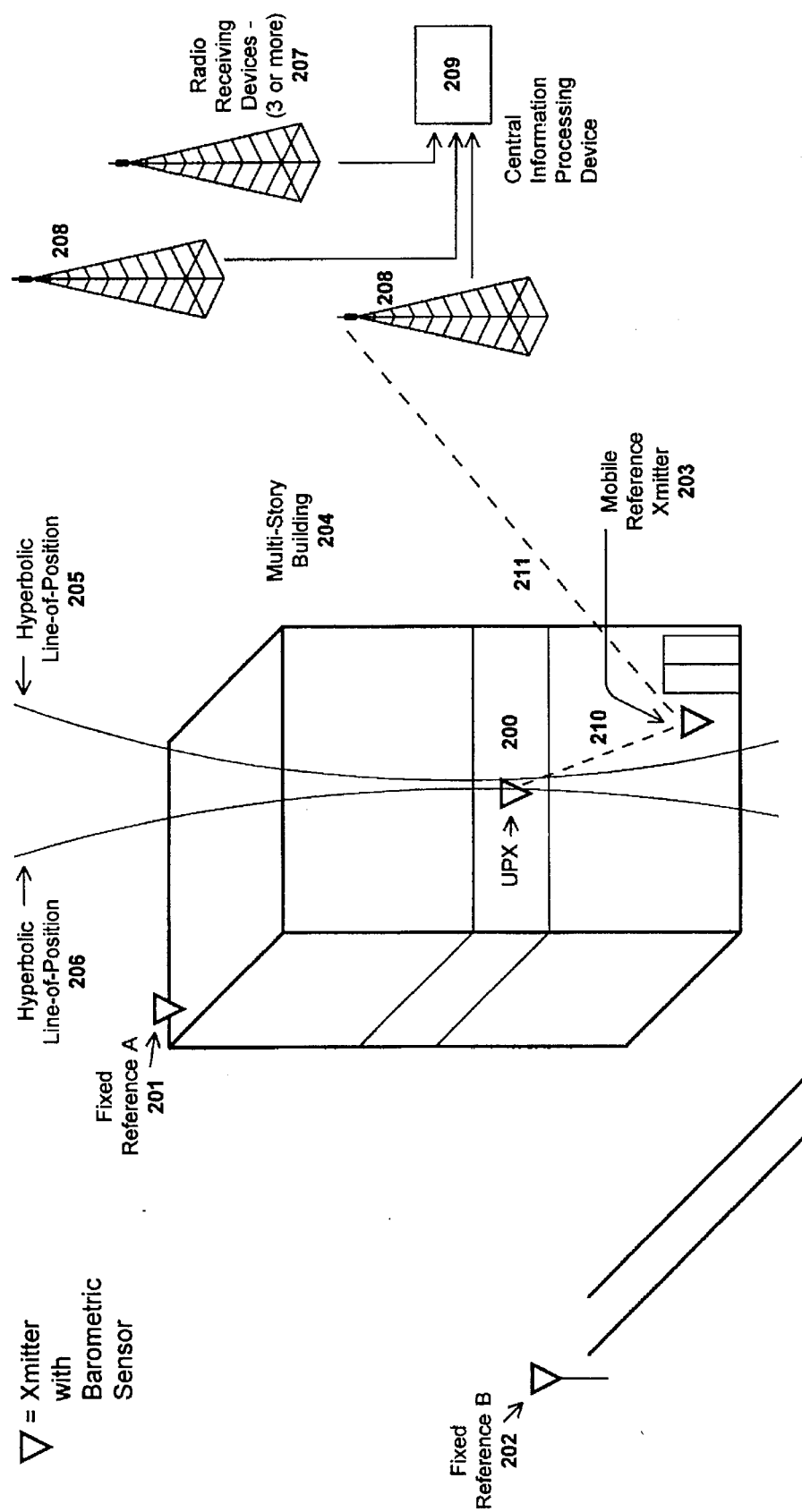
FIG. 2 illustrates the operation of an exemplary embodiment of the Z-Axis determination system of the present invention, wherein an unknown position transmitter (UPX) is situated within a building, and wherein there is provided a mobile reference transmitter (MRX), and fixed reference transmitters (FRX), all having barometric sensors embodied therein for providing relatively discernable altitude or height data, said transmitters for providing transmissions receivable by triangulated radio receiving devices discernable three dimension position information.

Referring to FIG. 2 of the drawings, it is particularly difficult to determine the position of a unknown position transmitter in a multi-story building 204. A unknown position transmitter 200 may be located on any one of several floors in a multi-story structure. A time-of-flight radio location system would compute hyperbolic lines of position similar to that shown in elements 205 and 206. These lines of position provide a poor geometry of intersection.

A fixed reference in a known position can be permanently installed 201 to one or more tall buildings in the coverage area. In addition to the reference at higher altitudes, lower altitude fixed reference 202 can be installed as well. A data base contained in central information processing device 209 can track relative information from these fixed references which are located across the coverage area.

In addition, a mobile reference transmitter 203 can be brought near or inside of the building of interest. This transmitter can be used to improve accuracy of the altitudes estimation by using differential calculation means.

The UPX will first transmit a signal to two or more radio receiving devices 208, 207 to provide the initial time of arrival position fix. This position fix is calculated by the central information processing device 209.

The central information processing device 209 collects both time of flight radio location information as well as barometric pressure information and optionally temperature compensation information as well. The central information processing device produces the X,Y,Z position fix. This processing means may be provided by an algorithmic technique such as a least squares fit. The altitude information may be enhanced by linearization techniques, such as FIT or linear interpolation.

In addition, the fixed references which are located in the coverage area may be input to a matrix computation table with preset weighted coefficients appropriate to yield the most accurate computational results. In the alternative to the above listed techniques, a neural network can be trained to provide a most likely correct position fix output.

The mobile reference transmitter 203 outfitted with a receiver capable of repeating a message from a UPX 200 would be able to provide additional information to the central information processing device 209. Altitude information from the UPX 200 could be derived in three steps. The UPX 200 may, if desired, transmit a signal 212 to the various radio receiving devices 208 and 207.

The mobile reference transmitter 203 would transmit locateable signals via path 211. Transmission from UPX 200 would also be received by mobile reference transmitter 203. Its added time-of-flight path is indicated by dashed line 210. The mobile reference transmitter 203 would repeat the signal received from UPX 200.

The central information processing device 209 would be able to subtract the mobile reference transmitter beacon pulse 203 from the repeated signal 210 in order to calculate the added path of travel 210. This added path of travel represents the radius about the MRX 203 from which to compute a sphere. This sphere would provide an indication of maximum altitude of the UPX 200 relative to the mobile reference transmitter 203.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A time-of-flight radio location system for determining enhanced three dimensional location information of an entity within a monitoring area, comprising:

a first transmitter configured to generate a beacon signal, said first transmitter situated in the vicinity of said entity, at an unknown location;

barometric sensing means for sensing barometric pressure data in the vicinity of said first transmitter;

altitude approximation means for calculating approximate altitude data regarding the Z-Axis location of said first transmitter, said altitude approximation means utilizing said barometric pressure data from said barometric sensing means;

radio receiving and processing means for receiving said beacon signal, said radio receiving and processing means utilizing said altitude data to approximate the altitude of said first transmitter, and said received beacon signal to approximate x and y coordinates of said first transmitter, thereby providing enhanced three dimensional location data on said first transmitter.

2. The time-of-flight radio location system of claim 1, wherein there is further provided temperature measuring and compensation means to measure the approximate temperature of the air in the vicinity of said first transmitter, providing temperature data, and utilizing said temperature data to enhance said altitude approximation means by compensating said barometric pressure data, utilizing said temperature data in conjunction with said barometric pressure data in calculating said approximate altitude data.

3. The time-of-flight radio location system of claims 1 or 2, wherein there is further provided tracking means to track daily/seasonal cycles of movement of said first transmitter, to remove cyclic/repeatable errors.

4. The time-of-flight radio location system of claim 1, wherein there is further provided at least one fixed reference transmitter installed in the vicinity of said first transmitter, said reference transmitter transmitting a reference signal for reception by said radio receiving and processing means, for enhanced calculation of the location and approximate altitude of said first transmitter.

5. The time-of-flight radio location system of claim 4, wherein said reference transmitter is equipped as a transponder to relay signals from said first transmitter to said radio receiving means, while transmitting other data to said radio receiving and processing means, providing additional data regarding environmental conditions in the vicinity of said transponder, for use by said radio receiving means for enhancing calculation of the location of said reference transmitter.

6. The time-of-flight radio location system of claim 5, wherein said additional data provides an indication of altitude of said first transmitter.

7. The time-of-flight radio location system of claim 5, wherein said reference transmitter is mobile.

8. A time-of-flight radio location system for determining enhanced three dimensional location information of a mobile entity within a monitoring area of a transmitter, said transmitter comprising:

transmission means configured to transmit a radio beacon signal;

said transmission means further comprising a barometric sensing element with an output to said transmission means, said barometric sensing element providing relative altitude data, which is included by said transmission means in said transmitted signal;

said radio location further comprising:

radio receiving and processing means configured to receive said radio beacon signal and said relative altitude data, said radio receiving and processing means comprising at least two receivers employing time-of-flight radio location methods utilizing said received radio beacon signal, for calculating the approximate X and Y coordinates of said transmitter, said radio receiving and processing means utilizing said relative altitude data for indicating the approximate altitude of said transmitter.

9. The time-of-flight radio location system of claim 8, wherein there is further provided temperature measuring and compensation means to measure the approximate temperature of the air in the vicinity of said transmitter, providing temperature data, and utilizing said temperature data to enhance said relative altitude data by compensating said barometric pressure data, utilizing said temperature data in conjunction with said barometric pressure data in calculating said approximate altitude data.

10. The time-of-flight radio location system of claim 8, wherein there is further provided tracking means to track daily/seasonal cycles of movement of said first transmitter to remove cyclic/repeatable errors.

11. The time-of-flight radio location system of claims 8 or 9, wherein there is further provided at least one fixed reference transmitter installed in the vicinity of said transmitter, said reference transmitter transmitting a reference signal for reception by said radio receiving and processing means, for enhanced calculation of the location and approximate altitude of said transmitter.

12. The time-of-flight radio location system of claims 8 or 9, wherein there is further provided a reference transmitter equipped as a transponder to relay signals from said transmitter to said radio receiving and processing means, while transmitting other data to said radio receiving and processing means, providing additional data regarding environmental conditions in the vicinity of said transponder, for use by said radio receiving means for enhancing calculation of the location of said reference transmitter.

13. The time-of-flight radio location system of claim 12, wherein said additional data provides an indication of altitude of said transmitter.

14. The time-of-flight radio location system of claim 12, wherein said reference transmitter is mobile.

15. A method of determining enhanced three dimensional location information of a mobile entity having an unknown location within a monitoring area, comprising the steps of:

a. providing an enhanced time-of-flight radio location system, comprising:

a first transmitter configured to generate a beacon signal, said first transmitter having an unknown location;

barometric sensing means for sensing barometric pressure data in the vicinity of said first transmitter;

altitude approximation means for calculating approximate altitude data regarding the Z-Axis location of said first transmitter, said altitude approximation means utilizing said barometric pressure data from said barometric sensing means;

radio receiving and processing means for receiving said beacon signal and said approximate altitude data, said radio receiving and processing means combining the altitude information with the related radio location information in such a manner as to provide enhanced three dimensional location data on said first transmitter;

b. forming a coverage area for said radio receiving and processing means;

c. placing said first transmitter, in the vicinity of said moveable entity, and within said coverage area of said radio receiving and processing means;

d. sensing barometric pressure data in the vicinity of said first transmitter;

e. utilizing said barometric pressure data to calculate approximate altitude data of the altitude in the vicinity of said first transmitter;

f. appending said approximate altitude data to said beacon signal of said first transmitter;

g. said first transmitter transmitting said beacon signal with said appended approximate altitude data;

h. receiving said beacon signal with said appended approximate altitude data;

I. utilizing said radio receiving and processing means to approximate the X and Y location of said first transmitter; and j. utilizing said approximate altitude data to approximate the Z-Axis location of said first transmitter;

k. providing enhanced three-dimensional location data of said first transmitter.

16. The method of claim 15, wherein step "d" includes the further step of measuring the temperature of the air in the vicinity of said transmitter, providing temperature data, and utilizing said temperature data to enhance said relative altitude data by compensating said barometric pressure data, utilizing said temperature data in conjunction with said barometric pressure data in calculating said approximate altitude data.

17. The method of claim 15, wherein there is added the further step of tracking the daily/seasonal cycles of movement of said first transmitter, compiling data on said move cyclic/repeatable errors.

18. The method of claims 15, 16, or 17, wherein the step "a" includes the further step of providing at least on fixed reference transmitter installed in the vicinity of said first transmitter, and there is included the further step of said reference transmitter transmitting a reference signal for reception by said radio receiving and processing means, for enhanced calculation of the location and approximate altitude of said first transmitter.

19. The method of claims 15 or 16, wherein step "a" includes the further step of providing a reference transmitter being equipped as a transponder, and there is further provided the step of relaying signals, via said transponder, from said first transmitter to said radio receiving and processing means, said transponder further transmitting other data to said radio receiving and processing means, providing additional data regarding environmental conditions at generally known locations in the vicinity of said transponder, for use by said radio receiving means for enhancing calculation of the location of said reference transmitter.

20. The method of claim 19, wherein said additional data provides an indication of relative altitude of said transmitter.

21. The method of claim 19, wherein said reference transmitter is mobile, and there is further included the step of bringing said reference transmitter into the proximity of said first transmitter.

22. The method of claim 21, wherein in step "a" there is included the further step of providing a mobile reference team having at least one mobile reference transmitter, and there is further included the step of locating said mobile reference team in the vicinity of said first transmitter, in order to provide, via said mobile reference transmitter, relative altitude data for enhancing probable location data on said first transmitter.

23. The method of claim 15, wherein said first transmitter in step "a" is provided with signal amplitude, and wherein there is included in step "g" the further step of said first transmitter transmitting signal amplitude data, and wherein there is included in step "i" the further step of said radio receiving and processing means receiving said signal amplitude data, said radio receiving and processing means further utilizing said amplitude data to further enhance the relative X and Y location of said first transmitter.

24. The method of claims 15, 16, or 17, 20, 21, 22, or 23 wherein said radio receiving and processing means in step "a" further is provided with multiple receiving antennas having diverse positions and heights, and there is further included in step "I" the further step of said radio receiving and processing means receiving via said multiple receiving antennas to receive said beacon signal, said radio receiving and processing means utilizing said multiple receiving antennas having diverse positions and heights to reduce fading and enhance signal strength, while providing enhanced cues to locate the correct location of said first transmitter.

25. A method of determining enhanced three dimensional location information of a mobile entity at an unknown location within a monitoring area, comprising the steps of:
 a. providing an enhanced radio location system, comprising:
  a first transmitter configured to generate a beacon signal;
  environmental sensing means for sensing environmental data indicating an environmental condition in the vicinity of said first transmitter;
  radio receiving and processing means for receiving said beacon signal and said environmental data, said radio receiving and processing means utilizing said environmental data and said beacon signal in such a manner as to provide enhanced three dimensional location data on said first transmitter,
 b. forming a coverage area for said radio receiving and processing means;
 c. placing said first transmitter in the vicinity of said moveable entity, within said coverage area of said radio receiving and processing means;
 d. sensing environmental condition data in the vicinity of said first transmitter;
 e. utilizing said environmental condition data to calculate approximate altitude data of the altitude in the vicinity of said first transmitter;
 f. said first transmitter transmitting said beacon signal;
 h. receiving said beacon signal;
 I. utilizing said radio receiving and processing means to approximate the X and Y location of said first transmitter; and
 j. utilizing said environmental condition data to approximate the Z-Axis location of said first transmitter.

26. The method of claim 25, wherein said environmental sensing means in step "a" comprises at least one gravimetric sensor, and wherein, in step "d", said environmental data comprises gravimetric data.

27. The method of claim 25, wherein said environmental sensing means in step "a" comprises at least one barometric sensor, and wherein, in step "d", said environmental data comprises barometric pressure data.

28. The method of claim 27, wherein there is provided in step "a" the additional step of providing multiple barometric sensors in the vicinity of said first sensor, at varying altitudes.

29. The method of claims 27 or 28, wherein step "d" includes the further step of measuring the temperature of the air in the vicinity of said transmitter, providing temperature data, and utilizing said temperature data to enhance said relative altitude data by compensating said barometric pressure data, utilizing said temperature data in conjunction with said barometric pressure data in calculating said approximate altitude data.

30. The method of claim 25, wherein there is added the further step of tracking the daily/seasonal cycles of movement of said first transmitter, compiling data on said move cyclic/repeatable errors.

31. The method of claim 25, wherein step "a" includes the further step of providing at least one fixed reference transmitter installed in the vicinity of said first transmitter, and there is included the further step of said reference transmitter transmitting a reference signal for reception by said radio receiving and processing means, for enhanced calculation of the location and approximate altitude of said first transmitter.

32. The method of claim 25, wherein step "a" includes the further step of providing a mobile reference transmitter equipped as a transponder, and there is further provided the step of relay signals, via said transponder, from said first transmitter to said radio receiving and processing means, said transponder further transmitting other data to said radio receiving and processing means, providing additional data regarding environmental conditions in the vicinity of said transponder, for use by said radio receiving means for enhancing calculation of the location of said reference transmitter.

33. The time-of-flight location system of claim 32, wherein said additional data provides an indication of altitude of said transmitter.

34. The method of claim 25, wherein said reference transmitter is mobile, and there is included the further step of bringing said first transmitter into the proximity of said first transmitter.

35. The method of claim 25, wherein in step "a" there is included the further step of providing a mobile reference team having at least one mobile reference transmitter, and there is further included the step of locating said mobile reference team in the vicinity of said first transmitter, in order to provide, via said mobile reference transmitter, relative altitude data for enhancing probable location data on said first transmitter.

36. The method of claim 25, wherein said first transmitter in step "a" is provided with signal amplitude, and wherein there is included in step "f" the further step of said first transmitter transmitting signal amplitude data, and wherein there is included in step "h" the further step of said radio receiving and processing means receiving said signal amplitude data, said radio receiving and processing means further utilizing said amplitude data to further enhance the approximate X and Y location of said first transmitter.

37. The method of claim 25, wherein said radio receiving and processing means in step "a" further is provided with multiple receiving antennas having diverse positions and heights, and there is further included in step "h" the further step of said radio receiving and processing means receiving via said multiple receiving antennas to receive said beacon signal, said radio receiving and processing means utilizing said multiple receiving antennas having diverse positions and heights to reduce fading and enhance signal strength, while providing enhanced time-of-flight radio location calculation capability.

38. A method of determining time-of-flight radio location information of an entity at an unknown location within a monitoring area, comprising the steps of:

a. providing an enhanced radio location system, comprising:
   a first transmitter configured to generate a beacon signal;
   radio receiving and processing means for receiving said beacon signal, said radio receiving and processing means utilizing said beacon signal in such a manner as to provide enhanced three dimensional location data on said first transmitter,
   a reference transmitter equipped as a transponder;
b. forming a coverage area for said radio receiving and processing means;
c. placing said first transmitter within the vicinity of said entity, and within the vicinity of said coverage area of said radio receiving and processing means,
d. placing said reference transmitter in the vicinity of said first transmitter;
e. said first transmitter transmitting said beacon signal;
f. utilizing said reference transmitter to relay signals from said first transmitter to said radio receiving and processing means, while transmitting other data to said radio receiving and processing means, providing additional data regarding environmental conditions at known locations in the vicinity of said transponder, for use by said radio receiving means for enhancing calculation of the location of said reference transmitter.
g. utilizing said receiving and transmitting means to receive said reference transmitter transmission;
h. utilizing said radio receiving and processing means to approximate the X and Y location of said first transmitter.

39. The method of claim 38, wherein said reference transmitter is mobile, and there is included the further step of re-positioning said first transmitter into the general proximity of said first transmitter to better ascertain the location of said first transmitter.

40. The method of claim 39, wherein in step "a" there is included the further step of providing a mobile reference team having at least one mobile reference transmitter, and there is further included the step of locating said mobile reference team in the vicinity of said first transmitter, in order to provide, via said mobile reference transmitter, relative altitude data for enhancing probable location data on said first transmitter.

41. The method of claim 38, wherein said first transmitter in step "a" is provided with signal amplitude, and wherein there is included in step "e" the further step of said first transmitter transmitting signal amplitude data, and wherein there is included in step "f" said reference transmitter relaying and retransmitting said signal amplitude data, and the added further step of said radio receiving and processing means receiving and utilizing said amplitude data to further enhance the approximate X and Y location of said first transmitter.

42. The method of claim 38, wherein said radio receiving and processing means in step "a" further is provided with multiple receiving antennas having diverse positions and heights, and there is further included in steps "g" and "h" the further steps of said radio receiving and processing means receiving via said multiple receiving antennas to receive said beacon signal, said radio receiving and processing means utilizing said multiple receiving antennas having diverse positions and heights to reduce fading and enhance signal strength, while providing enhanced time-of-flight radio location calculation capability.

43. The time-of-flight radio location system of claim 2, wherein there is further provided at least one fixed reference transmitter installed in the vicinity of said first transmitter, said reference transmitter transmitting a reference signal for reception by said radio receiving and processing means, for enhanced calculation of the location and approximate altitude of said first transmitter.

44. The time-of-flight radio location system of claim 9, wherein there is further provided tracking means to track daily/seasonal cycles of movement of said first transmitter to remove cyclic/repeatable errors.

* * * * *